May 20, 1941.  K. ZWICK  2,242,498

SLIDE GUIDE FOR MACHINE TOOLS

Filed May 14, 1938

Inventor
Kurt Zwick

By Cumpston & Shepard
Attorneys

Patented May 20, 1941

2,242,498

UNITED STATES PATENT OFFICE 2,242,498

SLIDE GUIDE FOR MACHINE TOOLS

Kurt Zwick, Munich, Germany, assignor to Friedrich Deckel, Munich - Prinz - Ludwigshohe, Bavaria, Germany Application May 14, 1938, Serial No. 208,030
In Germany August 1, 1936

7 Claims. (Cl. 308—6)

This invention deals with guiding means for slides or similar moving parts of machine tools and similar machines.

An object of the invention is the provision of an improved guide arrangement for such slides or similar parts.

Another object is the provision of guiding means which is capable of bearing relatively heavy loads without undue friction, so that the slide or similar part supported by this guiding means is movable relatively easily and freely, notwithstanding heavy load conditions.

A further object of the invention is the provision of such guiding means so designed and constructed that the slide is guided accurately with a minimum of undesirable play.

To these and other ends the invention resides in certain improvements and combinations of parts, all as will be hereinafter more fully described, the novel features being pointed out in the claims at the end of the specification.

In the drawing.

The same reference numerals throughout the several views indicate the same parts.

Figure 1:
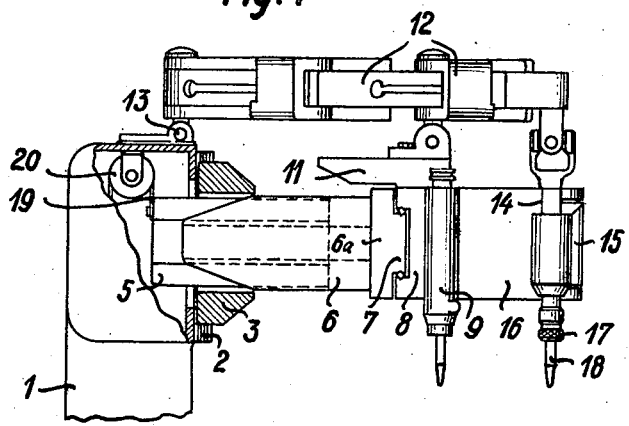
Fig. 1 is a side elevation, somewhat diagrammatic, and with parts in section, of a typical machine tool equipped with a slide guide of the present invention.
Figure 3:
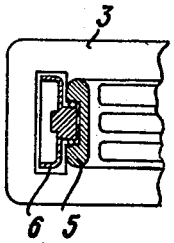
Fig. 3 is a fragmentary vertical section taken substantially on the line 3—3 of Fig. 2.
Figure 2:
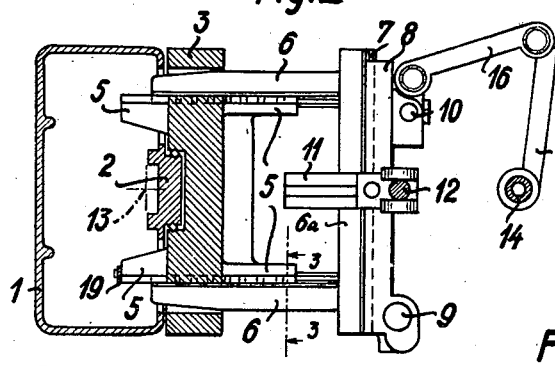
Fig. 2 is a plan thereof with parts in horizontal section.

Referring first to Figs. 1 to 3, there is shown, merely as an example of one form of machine tool with which the present slide guide may be employed, a pantograph engraving, and milling machine including an upright standard 1 having a vertical guide 2 on which a carrier 3 is movable upwardly and downwardly. The carrier 3 has forwardly extending horizontal arms 5 forming guideways for rearwardly extending arms 6 rigidly secured to a cross piece 6a, which cross piece has a horizontal guideway 7 on which the beam 8 is slidable horizontally in a direction approximately perpendicular to the direction in which the arms 6 slide on the arms 5. Thus the beam 8 is movable universally in all directions but each position thereof is parallel to each other position.

The beam 8 carries, for example, a tool holder 9, and a stylus holder 10. A cross bar 11 secured to the top of the beam 8 is connected, preferably by means of a universal joint, with a pantograph linkage of the lazytongs type, indicated in general at 12, the pantograph linkage having a main pivot (approximately vertical) which is mounted on the horizontal pivot 13 on the top of the standard 1. The holder 14, connected to the pantograph linkage 12, has a spindle having a chuck 17 at its lower end, which may be loosened to insert interchangeably either a tracing stylus or a cutting tool, indicated diagrammatically at 18. The holder 14 is kept always in substantially vertical position, although free to move both laterally and vertically, by means of a guiding link 15 pivoted to another guiding link 16 connected to the beam 8 or to the holder 10 which is mounted on the beam 8.

The weight of the vertically movable carrier 3 and all parts carried thereby is supported by suitable means such as the band 19 extending upwardly from the rear or inner end of one of the arms 5 of the carrier, to a pulley 20, and around this pulley and thence downwardly to a suitable spring or counterweight, not shown.

An engraving and milling machine of this general type must have its parts so arranged that, for certain kinds of work, the movable parts are very easily movable by comparatively slight hand pressure. To accomplish this, the movable parts must be able to slide on each other extremely easily, with low friction. Yet all of the parts must be accurately guided with practically no lateral play, in order that faithful and accurate reproductions of the pattern may be made. An engraving and milling machine of this kind has been referred to because it forms an excellent example of the kind of machine in which the present invention is particularly useful, this engraving and milling machine having a vertical guideway 2, and horizontal guideways between the parts 5 and 6, and another horizontal guideway 7, in all of which guideways the present invention may be advantageously employed. The present invention is not limited, however, to an engraving and milling machine such as above described merely for the sake of example, and is equally applicable to many different types of machine tools and similar machines where either accurate guiding or easy movability of one part on another is required. For instance, the present invention may be employed for the slides, tables, or similar movable parts, of drilling machines, grinding machines, planing machines, milling machines, tool stands of lathes, etc.

Figure 4:
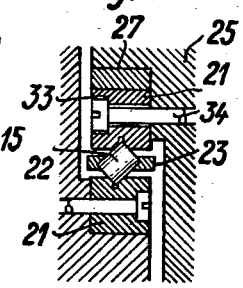
Fig. 4 is a cross section through the slide guide of the present invention on a larger scale, illustrating details.
Figure 5:
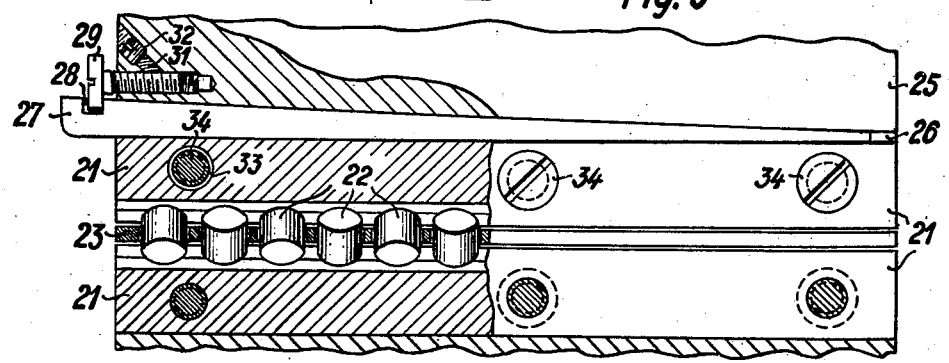
Fig. 5 is a longitudinal section through the same.

The guide means of the present invention comprises guide bars 21 mounted opposite each other on the two parts to be moved relatively to each other, each guide bar including a V-shaped groove faced toward the other, as seen in Fig. 4. Each V-shaped groove has its two bearing surfaces preferably at substantially a right angle to each other. Interposed between the bearing surfaces of the two grooves and the two members 21, is a series of rollers 22 placed relatively close to each other, alternate rollers being tilted in opposite directions as shown in Fig. 5. That is, alternate rollers will have their circular peripheries in contact with one of the bearing surfaces of one of the V-shaped grooves, and their flat ends faced toward the other bearing surface of the same groove, while the intermediate rollers will have their circular peripheries in contact with the second bearing surface of the same V-shaped groove, and their flat ends faced toward the first surface thereof.

These rollers have an axial length slightly less than the diameter of the rollers, so that the flat end surfaces of the rollers are never subjected to bearing pressure, the load being taken entirely by the circular peripheries of the rollers. The rollers are mounted in what may be termed a floating manner; that is, they have no pivots or axles. They are, however, held in proper position relatively to each other by means of a frame or cage 23, extending lengthwise of the guide or bearing between the two bars 21, and having openings 24 in which the individual rollers are placed to keep the rollers properly spaced from each other.

Figure 6:
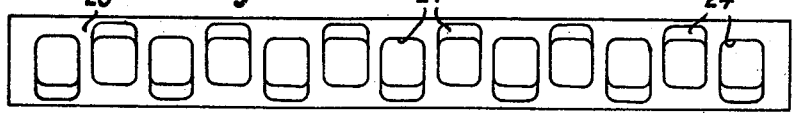
Fig. 6 is a plan of a cage used in spacing the bearing rollers.

The cage bar 23 is preferably of substantial thickness relatively to the size of the rollers, as shown in Fig. 4, and the openings or roller seats 24 are provided with lateral edges which are angularly arranged as indicated in Figs. 4 and 6. Preferably the perpendicular distance between these angular edge faces of each opening 24 is sufficient to take the length of a roller 22 (as shown in Fig. 4) but insufficient to accommodate the diameter of the roller, which is greater than the axial length thereof. Consequently, each seat will accommodate a roller only in one tilted position, and will not take a roller in the opposite tilted position. By forming the angular edges of the openings 24 so that the slopes of adjacent openings extend in opposite directions, as seen in Fig. 6, it is assured that the rollers cannot be placed in the wrong tilted position but must be placed in the desired position with adjacent rollers oppositely tilted. This enables the parts to be assembled more rapidly and insures the accurate placing of the rollers.

If the openings 24 are made somewhat larger so that the rollers may be placed in the openings in either tilted position, nevertheless the angular edge surfaces of these openings will bear such relation to the rollers that a misplaced roller will be at once apparent.

A roller guide of this kind, with a large number of rollers placed relatively closely together, is suitable for carrying quite heavy loads, and yet provides great ease of movement of the parts, without undesirable lateral play. Preferably, for heavy load conditions, the rollers are spaced quite closely to each other and extend throughout practically the entire available length of the guideway (with due consideration to the fact that the rollers will move bodily along the guide as the guided parts move on each other), the clear distance between adjacent rollers being preferably less than the diameter of one roller, as shown in Fig. 5. Of course, when a lighter load is to be carried, the spacing may be somewhat greater.

For accurate adjustment of the guide to take up all possible play and obtain maximum precision, it is advisable to make one or both of the grooved bars 21 adjustable with respect to the machine part on which it is mounted. For instance, the machine part 25 (Figs. 4 and 5) on which the upper one of the grooved bars 21 is mounted, may be so shaped as to leave a tapered space 26 between a shoulder on this part 25 and the upper edge of the grooved bar 21. A long wedge or tapered piece 27 is inserted in this space 26, and by moving this wedge longitudinally, the upper grooved bar 21 can be crowded closer to or relieved from the lower bar 21. To adjust the wedge 27, there may be provided a transverse groove 28 in a projecting end of the wedge, and the large head 29 of a screw screwed into the machine part 25 may engage in this groove 28 so that as the screw is turned in one direction or the other, the wedge is moved. After the parts have been adjusted to the desired position, they may be locked or clamped in this position by clamping means such as a clamping member 31 pressed against the shank of the screw 29 by means of a recessed set-screw 32. The openings 33 (Fig. 4) through which the main holding screws 34 of the bar 21 extend, are made somewhat larger than the screws 34, in order to allow relative adjusting movement of the upper grooved bar 21 toward or away from the lower grooved bar when the screws 34 are loosened.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Guiding and supporting means for accurately guiding and supporting heavy relatively movable parts of machine tools and the like, said guiding and supporting means including means forming a V-shaped groove on one of said parts, means forming a V-shaped groove on the other of said parts, said grooves being faced toward each other and extending longitudinally in the direction in which the two parts are to be moved relatively to each other, and a series of a relatively large number of rollers spaced relatively closely to each other with the clear distance between adjacent rollers substantially less than the diameter of each roller, said rollers being placed between said two grooves and extending into both of them, said rollers having axial lengths slightly less than their diameters and certain of said rollers having their axes lying in a common plane at a substantial angle to the common plane of the axes of certain other rollers.

2. Guiding and supporting means for accurately guiding and supporting heavy relatively movable parts of machine tools and the like, said guiding and supporting means including means forming a V-shaped groove on one of said parts, means forming a V-shaped groove on the other of said parts, each of said grooves having side walls substantially at a right angle to each other, said grooves being faced toward each other and extending longitudinally in the direction in which the two parts are to be moved relatively to each other, and a series of a relatively large number of rollers spaced relatively closely to each other with the clear distance between adjacent rollers substantially less than the diameter of each roller, said rollers being placed between said two grooves and extending into both of them, each roller having an axial length less than its diameter and being so placed that it rolls on different side walls of the two grooves than the side walls on which the next adjacent roller rolls.

3. Guiding and supporting means for relatively movable parts of machine tools and the like, said guiding and supporting means including means forming a V-shaped groove on one of said parts, means forming a V-shaped groove on the other of said parts, said grooves being faced toward each other and extending longitudinally in the direction in which the two parts are to be moved relatively to each other, a series of rollers spaced relatively closely to each other and placed between said two grooves and extending into both of them, said rollers all being of substantially the same size and having axial lengths less than their diameters, certain of said rollers being tilted in one direction with their axes in a common plane and the remainder of said rollers being tilted in another direction with their axes in a common plane at a substantial angle to the first mentioned plane, and a cage bar interposed between said two grooves and having openings for loosely receiving said rollers in a floating manner, the openings for the rollers tilted in one direction being of different shape and appearance from the openings for the rollers tilted in the other direction so that an incorrect tilt of a roller when assembling them will be readily apparent.

4. Guiding and supporting means for relatively movable parts of machine tools and the like, said guiding and supporting means including means forming a V-shaped groove on one of said parts, means forming a V-shaped groove on the other of said parts, said grooves being faced toward each other and extending longitudinally in the direction in which the two parts are to be moved relatively to each other, a series of rollers spaced relatively closely to each other and placed between said two grooves and extending into both of them, said rollers all being of substantially the same size and having axial lengths less than their diameters, certain of said rollers being tilted in one direction with their axes in a common plane and the remainder of said rollers being tilted in another direction with their axes in a common plane at a substantial angle to the first mentioned plane, and a substantially plane cage bar interposed between said two grooves and having openings for receiving said rollers, each of said openings having lateral edge surfaces formed at an angle to the plane of said bar and corresponding to the intended tilt of the roller to be received in that opening to minimize the possibility of placing rollers in said openings with an incorrect tilt when assembling the parts.

5. Guiding and supporting means as described in claim 4, in which the angular lateral edge surfaces of each opening are in planes substantially parallel to each other and at a perpendicular distance from each other sufficient to accommodate the axial length of a roller but insufficient to accommodate the diameter thereof.

6. Guiding and supporting means as described in claim 4, in which said rollers are floatingly placed in said cage bar openings and have no pivots or axles.

7. Guiding and supporting means for accurately guiding and supporting heavy relatively movable parts of machine tools and the like, said guiding and supporting means including walls forming a V-shaped groove on one of said parts, walls forming a V-shaped groove on the other of said parts, said grooves being faced toward each other and extending longitudinally in the direction in which the two parts are to be moved relatively to each other, and a series of a relatively large number of rollers spaced relatively closely to each other with the clear distance between adjacent rollers substantially less than the diameter of each roller, said rollers being placed between said two grooves and extending into both of them, each of said rollers having a cylindrical bearing surface with an effective bearing length almost equal to but slightly less than the diameter of the roller, said rollers being floatingly mounted in said grooves with the cylindrical surfaces of certain of said rollers rolling on one wall of each groove and with the cylindrical surfaces of the other rollers rolling on the other wall of each groove.

KURT ZWICK.